United States Patent [19]

Okabe et al.

[11] 3,854,995

[45] Dec. 17, 1974

[54] PROCESS FOR THE RECOVERY OF SUGARS FROM SPENT SULFITE LIQUOR

[75] Inventors: Jiro Okabe; Akira Machihara; Mutsumi Kaneyasu; Kojiro Kato, all of Iwakuni, Japan

[73] Assignee: Sanyo-Kokusaku Pulp Co., Ltd., Tokyo, Japan

[22] Filed: Mar. 19, 1973

[21] Appl. No.: 342,729

[52] U.S. Cl. .................. 127/43, 127/37, 127/46 R, 127/53
[51] Int. Cl. ........................... C13k 1/00, C13k 9/00
[58] Field of Search.................. 127/37, 46 R, 53, 43

[56] References Cited
UNITED STATES PATENTS

| 2,944,922 | 7/1960 | Boggs | 127/37 |
| 3,025,222 | 3/1962 | Thomsen | 127/37 X |
| 3,212,933 | 10/1965 | Hess | 127/37 |
| 3,266,933 | 8/1966 | Porter | 127/37 |
| 3,542,590 | 11/1970 | Paabo | 127/37 X |
| 3,627,636 | 12/1971 | Jaffe | 127/37 X |
| 3,639,171 | 2/1972 | Paabo | 127/37 |
| 3,700,501 | 10/1972 | Gasche | 127/37 |

Primary Examiner—Morris O. Wolk
Assistant Examiner—Sidney Marantz
Attorney, Agent, or Firm—Frank J. Jordan

[57] ABSTRACT

A process for the recovery of sugars from spent sulfite liquor which includes forming an aqueous solution of powdered spent sulfite liquor and a calcium base, having a pH in the range of 7.6–11.0 and extracting the sugars therefrom with either a $C_1$–$C_4$ alcohol or with a $C_1$–$C_4$ ketone.

3 Claims, No Drawings

PROCESS FOR THE RECOVERY OF SUGARS FROM SPENT SULFITE LIQUOR

The present invention relates to a process for the recovery of sugars from spent sulfite liquor. More specifically, it relates to a process for recovering sugars from spent sulfite liquor, comprising extracting sugars from a powdered calcium-base, spent sulfite liquor— into which calcium oxide or hydroxide has been incorporated, thereby rendering the powdered liquor of relatively low dissociativity and hygroscopicity-with a 75–96% lower alcohol or ketone having not more than 4 carbon atoms. The dry, powdered calcium-base, spent sulfite liquor (hereinafter referred to simply as "Ca-SSL-P") should have a calcium content sufficient to enable it, when in the form of a 5% aqueous solution, to exhibit a pH of, preferably, 7.6 to 11 (the pH value that is obtained with respect to such aqueous solution being hereinafter referred to simply as "pH").

Heretofore, the effective utilization of spent sulfite liquor (hereinafter referred to as "SSL") has been considered extremely important from the view-point of those desirous of obtaining the highly effective utilization of unused natural resources and the prevention of environmental pollution, and has constituted an important problem to pulp and paper manufacturers. Thus there have been many prior research efforts directed toward making effective use of SSL; however, such liquors, at present, continue to be very ineffectively used.

The SSL contains, in addition to lignosulfonates, reducing sugars in an amount of approximately 20% of the solid matter in the liquor. Thus the reducing sugars produced as by-products simultaneously with the production of sulfite pulp, amount annually to as much as 200,000 tons in Japan. Xylose is the main constituent of the sugars contained in SSL that are derived from the hardwood, and glucose and mannose are the main constituents of the sugars derived from softwood. Since these main constituents find wide use, a new process for the industrial recovery of sugars (including such main constituents) from SSL has been sought.

Many studies have heretofore been made in an attempt to establish a process for the selective recovery of said sugars; however, no such process has been developed yet which is worthy of industrialization. Only processes for producing ethanol and yeasts by the fermentation of SSL have previously been industrialized as processes for the selective utilization of the sugars from such liquor.

The recovering processes are broadly classified as precipitating, adsorbing, electrolytic dialysing and extracting processes. Among these processes, the first three are unsuitable to put into practice because the first needs an immense amount of expensive precipitating agents which are impossible to recover in a high yield after their use and the second and third are disadvantageous in that the adsorbents and dialysing membranes used respectively therein do not have satisfactorily long lives.

On the other hand, the prior reported extracting processes are further broadly classified in terms of two groups, one relating to those processes using SSL in the concentrated form as a starting material and the other relating to those processes using such liquor in the powder form as a starting material. In the former group of processes extraction is effected by the use of a 95 – 98% ethanol, a 88% isopropyl alcohol or the like or by the use of a mixture of acetone with methanol, ethanol, isopropanol, tert-butanol or the like, with the result that the content of sugars in the extracted solid matter is in the range of from 30 to 35% at maximum because of transfer of the sugars together with remarkable amounts of their modified derivatives and lignosulfonic acid, thereby making these former processes very unsuitable; while it is reported that in the latter group of processes non-neutralized or partially neutralized (pH 5–6) SSL is incorporated with methanol, ethanol, 2-ethoxyethanol, isopropanol or the like to effect the extraction of sugars from the solids. If any one of said solvents used contains water in excess of a certain proportion (for example, at least 4% of water relative to ethanol), the extraction efficiency obtained will be high but the liquor solids will absorb the moisture to form agglomerates thereof thereby making the extracting and filtering operations difficult to perform and consequentially making the actual practice of the processes of the latter group unsuitable with the result that the content of sugars contained in the extracted solid matter is approximately 40% at most. On the other hand, if the organic solvent used contains no water or water in amounts smaller than a certain one, none or only small amounts of rubbery agglomerates will form and the content of sugars in the solid matter to be extracted will be 50 – 70% while the extraction efficiency will be extremely low and an immense amount of the solvent will be needed for a sufficient extraction of the sugars, thereby raising an economic problem which still remains unsolved.

The primary object of the present invention is to provide a process for recovering sugars economically from the sulfite waste liquor, thus eliminating all of the disadvantages of conventional processes, such as low contents of sugars in the extracted solid matter due to agglomeration caused in the extracting step, low filterability and distribution of other constituents than the sugars, such as lignosulfonic, aldonic and sugarsulfonic acids, into the extracting liquid or solvent.

As the result of various basic studies made in an attempt to attain said object, it has been found herein that Ca-SSL-P of relatively decreased in dissociativity and hygroscopicity can be obtained by adding thereto calcium oxide or hydroxide, in such amounts that the calcium containing powder will exhibit a pH of 7.6 – 11.0, and by extracting the calcium-containing powder with a 75 –96% lower alcohol or ketone having not more than 4 carbon atoms and that, as a result sugars can be extracted from the calcium compound-added powder, the extracted sugars being contained in the whole extract in amounts of as high as 60 to 95% by weight thereof. It has also been found that during the practice of the present process, no agglomeration at all occurs, filtration is extremely easy, and the efficiency of sugar extraction is high.

The present invention is based on the discovery that calcium oxide or hydroxide, when incorporated into SSL-P in such amounts that the thus-incorporated liquor solids will exhibit a pH of 7.6–11.0, will form calcium chelates with the lignosulfonic, aldonic, sugarsulfonic and like acids contained in the liquor in the extracting step thereby making these component acids less dissociative and hygroscopic and also organic solvent-phobic in a high degree.

The less dissociative and hygroscopic Ca-SSL-P which may be used herein include Ca-SSL-P prepared by adding to Ca-SSL calcium oxide or hydroxide in such amounts that the liquor may have a pH of 7.6 to 11.0, drying the resulting mixture and then powdering the dried mass; Ca-SSL-P prepared by decationizing (removing the cations of) a base—(a base other than a calcium base) SSL to form a base-free one into which calcium oxide or hydroxide is incorporated in such amounts that the base-free liquor may have a pH of 7.6 to 11.0, and thereafter drying the and then powdered; powdered calcium compound-added, Ca-SSL-P prepared by adding to Ca-SSL-P powdered calcium oxide or hydroxide in such amounts that the resulting calcium compound-added powder will exhibit a pH of 7.6 to 11.0 when in a consistency of 5% thereof; and calcium compound-added, Ca-SSL-P prepared by adding, in the extracting step, to Ca-SSL-P a suspension of calcium oxide or hydroxide in the extracting solvent in such amounts the thus-added liquor in the powder form will exhibit a pH of 7.6 to 11.0.

Further, in the practice of the present invention, it is effective and advantageous that a divalent or other polyvalent metallic compound which is capable of forming a chelate compound with the lignosulfonic, aldonic or sugarsulfonic acid, be added before or during the extracting step to further decrease the dissociativity and hydroscopicity of these acids and to further increase the organic solvent-phobic property thereof.

In connection with the present invention, there is known a process for the extraction of sugars from sulfite waste liquor by adding 10 parts by weight of calcium carbonate to 100 parts by weight of the sulfite waste fiquor in the powder form and then subjecting the resulting mixture to extraction with a 96% ethanol. However, since the pH of this mixture when in the form of a 5% aqueous solution, is such that it will exhibit a pH of only approximately 5.5, and the extract obtained contains the sugars in amounts of approximately 50% at most.

The reason for the pH limitation to 7.6–11.0 in the practice of the present invention is as follows. The use of pH's of lower than 7.6 will give a high efficiency of extracting the sugars but, at the time of extraction, cause the agglomeration thereby making difficult the performance of the subsequent extracting and filtering operations with the result that the solid matter so extracted contains the sugars in amounts of only approximately 40–50% at most, while the use of pH's of more than 11.0 will give an extract having a high content of the sugars but will exhibit an unsatisfactory extracting efficiency for the sugars.

As extraction solvents, there can be used alcoholic or ketonic solvents containing 75–96% of a lower alcohol or ketone having not more than 4 carbon atoms. Even in cases where the content of the alcohol or ketone in the solvent used is lower than 75% or higher than 96%, the use of the less dissociative and hygroscopic, Ca-SSL-P according to the present invention will make it possible to effect the recovery of the sugars quite effectively. However, if the content is lower than 75% the increase in extraction recurrence will cause some agglomeration of the remainder to be extracted whereby the subsequent extracting and separating operations are made difficult with the result that the content of the sugars in the extract obtained is quite low, while if the content is more than 96% the extracting efficiency will be low.

In contrast to the above, even when the recurrence of extraction is increased, the use of the solvents having a content of 75–96% of the solvents having a content of 75–96% of the alcohol or ketone according to the present invention will cause no agglomeration at all, will produce the post-extraction residue which can be granulated without stickiness when dried will permit the filtration to be conducted very easily, and will give a high sugar-extracting efficiency with the result that the content of the sugars in the extract obtained is very high compared with that in the extract obtained by the conventional processes.

The lower alcohols and ketones with four or less carbon atoms include ethanol, n-propanol, isopropanol, n-butanol, tert-butanol, acetone and methyl ethyl ketone. These solvents may be used singly, in admixture or stepwise jointly.

The SSL which may be used herein should essentially be calcium-based and in the powder form at the time of extraction although the composition of sugars to be recovered varies depending on the kind of pulp wood from which the liquor is derived and on the digesting conditions. Thus, the kind of pulp wood, the digesting conditions and the like are not especially limiting factors.

The extraction conditions such as ratios and amounts of the SSL-P and extraction solvent, extracting temperatures and extracting apparatuses, may be optionally selected.

A concentrated solution of the sugars, which is prepared by distilling off the solvent from the extract in the solvent obtained according to the present invention, may be used, as is, as material for fermentation or other products. It may be further fractionated into individual pure component sugars or may be used in the production of the corresponding sugar alcohols. The xylose so fractionated and the xylitol obtained by the reduction thereof are of interest as non-calorific foodstuffs and sweetening materials suitable for diabetics, as wet-controlling agents and as suitable materials for surface-active agents and binders. The mannose and the derivatives thereof obtained by the process of the present invention are useful as medical supplies and sweetening materials.

The present invention and the effects thereof will be better understood by the following examples.

EXAMPLES 1–3

Three samples each consisting of 50 grams (solid matter: 46.5g) of hardwood-derived Ca-SSL-P having a pH of 5.5 and containing reducing sugars in the amount of 19.6% by weight of the solid matter contained in the powder were admixed with 1.0g, 1.8g and 5.0g of calcium hydroxide, respectively, these amounts being necessary in order to the thus-incorporated samples to have pH's of 7.6, 9.3 and 11.0, respectively. These three mixtures so obtained were each mixed with 200 ml of a 88% isopropyl alcohol, agitated and subjected to extraction at room temperatures for 10 minutes and then suction filtered to obtain a filtrate from which the solvent (isopropyl alcohol) was distilled off to obtain an extract.

The particulars of the extracts thus obtained are shown in Table 1. From the Table it is seen that in Examples 1–3 the extracting and filtering operations were carried out very easily and the content of sugars in the extracted solid matter was very high, that is, 85–93%. For comparison, on the other hand, the following three Comparison examples 1–3 are presented.

In these Comparison examples, 50g of SSL-P having a pH of 5.5, 50g of SSL-P having a pH of 5.5 admixed with 7.1g of calcium hydroxide (this mixture having a pH of 12), and 50g of SSL-P having a pH of 5.5 admixed with calcium carbonate (2.4g) which is equivalent in calcium content to calcium hydroxide (1.8g) as used in Example 2, were extracted under the same operational conditions as in Examples 1–3. The results show that the use solely of the solids having a pH of 5.5 (Comparison example 1) and the use of the solids admixed with the calcium carbonate (Comparison example 3) caused the formation of rubbery agglomerates at the time of extraction thereby rendering the extracting and filtering operations so very difficult that the extracted solid matter contained the sugars in an amount of less than 40% although the extraction had been forcibly conducted, while the use of the solids admixed with calcium hydroxide (Comparison example 2) produced a somewhat hardened extraction residue, thereby adversely affecting the filtering operation, and gave an extract wherein the content of sugars was as low as 10%.

The composition of the extracted solid matter obtained in Example 3 was 81% of xylose, 5% of arabinose, 3% of glucose, 1% of mannose, 1% of galactose, 2% of calcium lignosulfonate and 1% of ashes.

EXAMPLES 4–5

There were prepared two samples each consisting of 10 kg (solid matter: 9.48 kg) of softwood-derived Ca-SSL-P having a pH of 3.3 and a content of 20.4% of reducing sugars in the powder. One of the two samples was mixed with 60 liters of a slurry of 800g calcium hydroxide in 60 liters of 80% isopropyl alcohol and the other mixed with the same amount of a slurry which was the same as above except that 605g of calcium oxide was substituted for the calcium hydroxide, to allow the two thus prepared samples to have a pH of 9.0. These samples were each subjected to extraction for 10 minutes by the use of a homogenizing mixer operating at 5,000 rpm and then centrifuged to obtain a filtrate from which the solvent was distilled off to obtain an extract as particularized in Table 2.

Table 2

|  | Additive | Agglomeration caused at the time of extraction | Filterability | Solid matter extracted (g) | Content of sugars in solid matter extracted (%) | Sugars-extracting rate (%) |
|---|---|---|---|---|---|---|
| Example 4 | Calcium hydroxide | None | Good | 506 | 94.8 | 24.8 |
| Example 5 | Calcium oxide | None | Good | 517 | 93.6 | 25.1 |

EXAMPLES 6–8

There were provided three samples each consisting of 1 kg (solid matter: 994 g) of powdery material containing reducing sugars in the amount of 19.9% by weight of the solid matter and having a pH of 8.7, the powdery material being prepared by admixing hardwood-derived Ca-SSL-P having a pH of 5.4 with calcium hydroxide in the amount of 4.0% by weight of the solid matter contained in the powder thereby allowing the thus-prepared powder to have a pH of 8.7 and then spray drying the thus-prepared powder to obtain the powdery material. The samples so provided were then prepared with 4 liters of a 75% ethanol, 4 liters of a 90% ethanol and 4 liters of a 96% ethanol, respectively. The ethanol-containing samples were each agitated at 25°C for 10 minutes and thereafter filtered to obtain a filtrate from which the ethanol was distilled off thereby resulting in an extract as particularized in Table 3. As is seen from this Table, the use of each of the 75%, 90% and 96% ethanols as the extracting solvent allowed the filtering operation to be performed very easily and gave a high sugars-extracting rate as well as an extract having a high content of sugars.

For comparison, the same procedure of Example 6 was followed except that the use of a 70% ethanol was substituted for the use of the 75% ethanol (Comparison example 4) and a 100% ethanol was substituted for the Table 1

|  | Amount of calcium hydroxide used (g) | 5% aqueous solution of sample pH | Agglomeration caused at the time of extraction | Filterability | Solid matter extracted (g) | Content of sugars in the solid matter extracted (%) | Sugars-extracting rate (%) |
|---|---|---|---|---|---|---|---|
| Example 1 | 1.0 | 7.6 | None | Good | 2.3 | 85.6 | 21.6 |
| Example 2 | 1.8 | 9.3 | None | Good | 2.0 | 92.7 | 21.2 |
| Example 3 | 5.0 | 11.0 | None | Good | 1.8 | 93.1 | 18.4 |
| Comparison example 1 | — | 5.5 | Remarkable agglomeration | Poor | 5.5 | 38.4 | 23.4 |
| Comparison example 2 | 7.1 | 12.2 | None | Somewhat poor | 1.0 | 90.2 | 9.9 |
| Comparison example 3 | Calcium carbonate 2.4 | 5.7 | Remarkable agglomeration | Poor | 5.2 | 39.5 | 22.5 | use of the 75% ethanol (Comparison example 5). For further comparison, 1 kg (solid matter: 928 g) of sodium-base powder prepared by (a) decationizing with sulfuric acid the same liquor having a pH of 5.4 as used in Example 6, (b) admixing the decationized liquor with sodium hydroxide an adjusting the mixture to a pH off 8.9 and then (c) spray drying the thus-alkalized liquor, was mixed with 4 liters of a 90% ethanol for effecting the extraction in the same manner as previously mentioned. From Table 3 it is seen that the process of the present invention is very satisfactory when compared with the conventional process.

Table 3

| | Base | Ethanol content in solvent (%) | Agglomeration caused at the time of extraction | Filterability | Solid matter extracted (g) | Content of sugars in solid matter extracted (%) | Sugars-extracting rate (%) |
|---|---|---|---|---|---|---|---|
| Example 6 | Calcium | 75 | None | Good | 118 | 64.0 | 40.0 |
| Example 7 | Calcium | 90 | None | Good | 58 | 70.3 | 21.8 |
| Example 8 | Calcium | 96 | None | Good | 32 | 72.8 | 12.1 |
| Comparison example 4 | Calcium | 70 | Agglomeration | Poor | 210 | 45.0 | 50.4 |
| Comparison example 5 | Calcium | 100 | None | Good | 6 | 76.4 | 2.4 |
| Comparison example 6 | Sodium | 90 | Remarkable agglomeration | Poor | 314 | 40.1 | 31.3 |

EXAMPLES 9-10

Two samples were each prepared as follow. Two sets of the same liquor solids (100g) having a pH of 5.5 as used in Example 1 were mixed with 4.2g of powdered calcium hydroxide and 2.1g of powdered aluminum sulfate octadecahydrate to obtain the samples having a pH of 8.5, respectively.

These samples so obtained were mixed respectively with 400 ml of a 80% acetone and 400 ml of a 80% tert-butanol and then subjected to extraction at 50°C for 30 minutes. The results are shown in Table 4.

Table 4

| | Solvent used | Agglomeration caused at the time of extraction | Filterability | Solid matter extracted (g) | Content of sugars in solid matter extracted (%) | Sugars-extracting rate (%) |
|---|---|---|---|---|---|---|
| Example 9 | 80% acetone | None | Good | 2.3 | 76.3 | 18.9 |
| Example 10 | 80% tert.-butanol | None | Good | 1.4 | 95.6 | 14.2 |

What is claimed is:

1. A process for the recovery of sugars from spent sulphite liquor, comprising (a) incorporating a calcium base selected from the group consisting of calcium oxide and calcium hydroxide into a spent sulfite liquor in powder form, said base being in such an amount that a 5% aqueous solution of the resulting mixture will exhibit a pH of 7.6–11.0, (b) forming said aqueous solvent and (c) extracting the resulting aqueous solution containing said calcium base with a solvent selected from the group consisting of 75–96% $C_1$–$C_4$ alcohols and 75–96% $C_1$–$C_4$ ketones to recover sugars from said mixture.

2. A process for the recovery of sugars according to claim 1, wherein the lower alcohol is selected from the group consisting of ethanol, n-propanol, isopropanol, n-butanol and tert-butanol.

3. A process for the recovery of sugars according to claim 1, wherein the lower ketone is selected from the group consisting of acetone and methyl ethyl ketone.

* * * * *